US008585489B2

(12) United States Patent
Cannon

(10) Patent No.: US 8,585,489 B2
(45) Date of Patent: Nov. 19, 2013

(54) METHOD AND APPARATUS FOR COMPETITIVE BONUS GAMES BASED UPON STRATEGY OR SKILL

(75) Inventor: Lee E. Cannon, Bozeman, MT (US)

(73) Assignee: IGT, Las Vegas, NV (US)

( * ) Notice: Subject to any disclaimer, the term of this patent is extended or adjusted under 35 U.S.C. 154(b) by 235 days.

(21) Appl. No.: 13/242,023

(22) Filed: Sep. 23, 2011

(65) Prior Publication Data

US 2012/0015713 A1 Jan. 19, 2012

Related U.S. Application Data

(63) Continuation of application No. 12/184,778, filed on Aug. 1, 2008, now Pat. No. 8,033,912, which is a continuation of application No. 10/028,757, filed on Dec. 21, 2001, now abandoned.

(51) Int. Cl.
*A63F 9/24* (2006.01)
*G06F 19/00* (2011.01)

(52) U.S. Cl.
USPC .................... 463/25; 463/30; 463/20; 463/16

(58) Field of Classification Search
None
See application file for complete search history.

(56) References Cited

U.S. PATENT DOCUMENTS

| | | | |
|---|---|---|---|
| 5,286,036 | A | 2/1994 | Barabash |
| 5,560,603 | A | 10/1996 | Seelig et al. |
| 5,564,700 | A | 10/1996 | Celona |
| 5,664,998 | A | 9/1997 | Seelig et al. |
| 5,718,429 | A | 2/1998 | Keller, Jr. |
| 5,779,544 | A | 7/1998 | Seelig et al. |
| 5,823,874 | A | 10/1998 | Adams |
| 5,848,932 | A | 12/1998 | Adams |
| 5,876,284 | A | 3/1999 | Acres et al. |
| 5,882,258 | A | 3/1999 | Kelly et al. |
| 5,882,261 | A | 3/1999 | Adams |
| 5,980,384 | A | 11/1999 | Barrie |

(Continued)

FOREIGN PATENT DOCUMENTS

| | | |
|---|---|---|
| GB | 2 083 936 | 3/1982 |
| JP | 07-275507 A | 10/1995 |

(Continued)

OTHER PUBLICATIONS

Letter from Marvin A. Motsenbocker of Mots Law dated Mar. 12, 2012 regarding Third Party Submission in Published Application Under 37 C.F.R. 1.99 filed for U.S. Appl. No. 13/242,550 (1 page).

(Continued)

*Primary Examiner* — Paul A D'Agostino

(74) *Attorney, Agent, or Firm* — Neal, Gerber & Eisenberg LLP

(57) ABSTRACT

The present invention relates to gaming systems and methods where enablement for play of a bonus game is linked to play of a primary game. A player may qualify for the bonus game by preselected criteria associated with play of the primary game. The qualified players may participate in the bonus game and compete against one another in one or more rounds to achieve a final winning outcome based on the individual player's skill, strategy, or knowledge. The player who achieves the final winning outcome at the end of a plurality of rounds of the bonus game is awarded a bonus pool funded by a portion of wagers accumulated during play of the primary game.

20 Claims, 4 Drawing Sheets

(56) References Cited

U.S. PATENT DOCUMENTS

| | | | |
|---|---|---|---|
| 6,012,982 | A | 1/2000 | Piechowiak et al. |
| 6,050,895 | A | 4/2000 | Luciano, Jr. et al. |
| 6,089,976 | A | 7/2000 | Schneider et al. |
| 6,089,978 | A | 7/2000 | Adams |
| 6,089,980 | A | 7/2000 | Gauselmann |
| 6,146,273 | A | 11/2000 | Olsen |
| 6,173,955 | B1 | 1/2001 | Perrie et al. |
| 6,193,606 | B1 | 2/2001 | Walker et al. |
| 6,210,275 | B1 | 4/2001 | Olsen |
| 6,217,448 | B1 | 4/2001 | Olsen |
| 6,224,486 | B1 | 5/2001 | Walker et al. |
| 6,311,976 | B1 | 11/2001 | Yoseloff et al. |
| 6,394,899 | B1 | 5/2002 | Walker |
| 6,398,218 | B1 | 6/2002 | Vancura |
| 6,413,160 | B1 | 7/2002 | Vancura |
| 6,419,577 | B1 | 7/2002 | Okada et al. |
| 6,428,412 | B1 | 8/2002 | Anderson et al. |
| 6,443,837 | B1 | 9/2002 | Jaffe et al. |
| 6,497,408 | B1 | 12/2002 | Walker et al. |
| 6,565,434 | B1 | 5/2003 | Acres |
| 6,605,001 | B1 | 8/2003 | Tarantino |
| 6,607,437 | B2 | 8/2003 | Casey et al. |
| 6,612,575 | B1 | 9/2003 | Cole et al. |
| 6,626,758 | B1 | 9/2003 | Parham et al. |
| 6,634,943 | B1 * | 10/2003 | Baerlocher ..................... 463/25 |
| 6,645,071 | B2 | 11/2003 | Perrie et al. |
| 6,645,074 | B2 | 11/2003 | Thomas et al. |
| 6,676,521 | B1 | 1/2004 | La Mura et al. |
| 6,685,561 | B2 | 2/2004 | Anderson et al. |
| 6,709,331 | B2 | 3/2004 | Berman |
| 6,769,986 | B2 | 8/2004 | Vancura |
| RE38,812 | E | 10/2005 | Acres et al. |
| 6,988,732 | B2 | 1/2006 | Vancura |
| 7,169,041 | B2 | 1/2007 | Tessmer et al. |
| 2002/0025845 | A1 | 2/2002 | Cannon |
| 2002/0039923 | A1 | 4/2002 | Cannon et al. |
| 2002/0077173 | A1 | 6/2002 | Luciano et al. |
| 2003/0100361 | A1 | 5/2003 | Sharpless et al. |
| 2003/0114219 | A1 | 6/2003 | Mcclintic |
| 2003/0125107 | A1 | 7/2003 | Cannon |
| 2003/0199306 | A1 | 10/2003 | Parker |

FOREIGN PATENT DOCUMENTS

| | | |
|---|---|---|
| JP | 2000-024320 A | 1/2000 |
| JP | 2001-000749 A | 1/2001 |
| WO | WO 98/51384 | 11/1998 |

OTHER PUBLICATIONS

Third Party Submission in Published Application Under 37 C.F.R. 1.99 filed for U.S. Appl. No. 13/242,550, dated Mar. 12, 2012 (3 pages).

Partially-highlighted JP 2001-000749A and English translation of paragraphs [0008] and [0009] of same submitted with Third Party Submission in Published Application Under 37 C.F.R. 1.99 for U.S. Appl. No. 13/242,550 (4 pages).

Partially-highlighted U.S. Patent No. 6,419,577 submitted with Third Party Submission in Published Application Under 37 C.F.R. 1.99 for U.S. Appl. No. 13/242,550 (2 pages).

Letter from Marvin A. Motsenbocker of Mots Law dated Mar. 19, 2012 regarding Third Party Submission in Published Application Under 37 C.F.R. 1.99 filed for U.S. Appl. No. 13/242,023 (1 page).

Third Party Submission in Published Application Under 37 C.F.R. 1.99 filed for U.S. Appl. No. 13/242,023, dated Mar. 19, 2012 (3 pages).

Certain portions of JP 2000-024320A and English translation of paragraphs [0017] and [0018] of same submitted with Third Party Submission in Published Application Under 37 C.F.R. 1.99 for U.S. Appl. No. 13/242,023 (4 pages).

Certain portions of JP 07-275507A and English translation of paragraph [0007] of same submitted with Third Party Submission in Published Application Under 37 C.F.R. 1.99 for U.S. Appl. No. 13/242,023 (3 pages).

* cited by examiner

METHOD AND APPARATUS FOR COMPETITIVE BONUS GAMES BASED UPON STRATEGY OR SKILL

PRIORITY CLAIM

This application is a continuation of, and claims priority to and the benefit of, U.S. patent application Ser. No. 12/184,778, filed on Aug. 1, 2008, which is a continuation of, and claims priority to and the benefit of, U.S. patent application Ser. No. 10/028,757, filed on Dec. 21, 2001, now abandoned, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present invention relates generally to gaming systems and methods. More specifically, the present invention relates to gaming systems and methods wherein a player is able to wager against other players in a bonus game based upon strategy or skill.

Various mechanical and electronic gaming systems and their associated apparatus and methods of use are well known in the gaming industry. Slot machines have long been a significant part of the gaming industry and, now, video versions of slot machines are very popular.

Gaming establishments are continually searching for new games and gaming systems to keep the interest of players. Gaming establishments such as casinos are concerned that if players lose interest in a game, the gaming machine will sit idle and not contribute to the revenue of the casino. By developing new games, the gaming establishments hope to stimulate existing players' interests in continued wagering and to attract new players. In addition, players may tend to be more active and consistent in playing the gaming machines that have new games, thus enhancing the potential profit of the gaming machine.

To keep and increase players' interest in gaming, the gaming industry has added "bonus games" to many of its gaming machines, including reel and electronic slot machines. A bonus game is a secondary game that is typically activated when the player achieves a specific outcome in a primary game. For instance, the bonus game may be activated when the player receives a winning hand (in the case of a card game) or a specified combination of symbols (in the case of a reel-type game) as an outcome of the primary game being played. Bonus games appeal to players because the probability of receiving winning combinations after entry into the bonus game is, at least, greatly enhanced and, in most instances, some sort of winning outcome is guaranteed.

The bonus game is typically a different type of game than the primary game, which provides more excitement and variety for the player and helps to keep the player at the gaming machine for a longer period of time. However, the bonus game may also be the same type of game as the primary game, except that the bonus game has an increased potential for winning in comparison to the primary game.

In many cases, the bonus game is a singular event in that the play changes to the bonus game when the specific outcome is achieved in the primary game. The bonus game is then played to completion. Examples of this type of bonus game are disclosed in U.S. Pat. Nos. 5,823,874, 5,848,932, 5,882,261 and 6,089,978, all to Adams. Various embodiments as disclosed in the aforementioned patents include methods of playing games employing gaming machines as well as table games for play of primary games and at least one pay out indicator for a secondary or bonus game. The bonus game is independent of the primary game, but is enabled by selected outcomes in the primary game. One embodiment operates such that when the reels of the primary game produce a preselected outcome, the bonus game is enabled. In the bonus game, the player initiates the spin of a wheel or reel bearing a number of payout values, or initiates another bonus event such as a bowling-type or pinball-type payout indicator. When the bonus event is completed, the amount of the bonus payout is indicated. In the bonus games as disclosed in the aforementioned patents, the players are playing against the house and are not playing against one another.

Another example of a bonus game is described in U.S. Pat. No. 6,089,976 to Schneider et al. In this design, the bonus game displays a multiplicity of images on a video monitor from which the player selects until achieving a pair of matched bonus awards.

In some cases, the bonus game is a more sequential event in that progressing through the bonus game is determined by continued play in the primary game. An example of this is described in U.S. Pat. No. 5,980,384 to Barrie. In that design, the player can win the primary game on each play of the game, and the bonus game can be won over a plurality of plays of the primary game.

The bonus game may also be conducted through a plurality of networked games such that the bonus game might involve a plurality of individuals who have been wagering at the primary games. Some examples of bonus gaming include U.S. Pat. No. 5,779,544, U.S. Pat. No. 5,664,998 and U.S. Pat. No. 5,560,603, all to Seelig et al. More particularly, some examples of bonus gaming including a plurality of networked primary gaming machines include U.S. Pat. No. 6,146,273 to Olsen, U.S. Pat. No. 6,012,982 to Piechowiak et al., and U.S. Pat. No. 5,876,284 to Acres et al.

In the above-mentioned bonus games, the player's odds of winning are based purely on chance because the games are configured so that the player has no opportunity to use skill to improve his or her odds. Stand-alone gaming machines based on skill, strategy, and/or knowledge are generally not used in the gaming industry because these games have several inherent problems. First, the player's level of skill may affect the percentage or net return that the gaming establishment or house expects to earn because the player's skill can not be easily predicted. In contrast, the house's net return in games of chance can be statistically predicted because winning outcomes have certain odds of occurring and have fixed award values associated therewith. So long as individual gaming machines perform according to these statistics, the gaming establishment can accurately predict its net return. Second, if the house's net return is dependent on the player's skill, the house may attempt to impact its net return by influencing the payout in the bonus game. For example, the house may make a skill-based bonus game extremely hard to win, making its net return easier to predict. Third, as games depend more heavily on player's skill, there is a greater impact on the expected payback percentage for the skilled versus the unskilled or mediocre player, which may raise regulatory and fairness issues in many jurisdictions.

A level of skill is present to a small degree in video card games, such as poker and blackjack, because a skilled player can expect a larger payback than an unskilled player. However, even a skilled player's skill level will rarely yield an expected payback percentage in excess of 100%, over time. Furthermore, an acceptable skill level is fairly readily achieved by many players such that the unskilled player has a reasonable expected payback percentage.

As used herein, the term "skill-based bonus game" refers to a bonus game where an outcome, such as a predetermined goal, task, or objective, may be determined primarily by the level of skill of the player. Generally, the greater the player's skill, the more easily the player may achieve the desired outcome. Stated another way, the skill-based bonus game requires the player to utilize skill, strategy, or knowledge to affect the outcome of the game. Skill-based bonus games may include strategy games (i.e., chess, checkers, or bridge), puzzles (i.e., mazes, crosswords, or jigsaws), dexterity games requiring hand-eye coordination (i.e., flight simulators or sports games), or knowledge games (i.e., trivia games). The trivia games may comprise questions from a variety of subjects including, but not limited to, history, sports, movies, and geography.

One example where a skill- or knowledge-based game has been used in the gaming industry is U.S. Pat. No. 6,193,606 to Walker et al. In this gaming device, a player is presented with a trivia question while the reels of the slot machine are spinning. If the player correctly answers the question before the reels stop and achieves a winning outcome, the player receives a larger payout than if he had only received the winning outcome. The amount of the payout is determined by an enhanced payout table.

While the above-mentioned bonus games have been used in the gaming industry, improved gaming systems and methods are still needed to stimulate and maintain players' interests in gaming. Preferably, these improved gaming systems and methods would appeal to the player's competitive nature and introduce skill-based bonus games where the net return of the house is not impacted by the player's level of skill. Such a bonus game would increase the player's level of excitement by placing players in a competitive setting and would appeal to those players who prefer to compete in bonus games based, at least partially, upon their own level of skill or knowledge. The bonus game would also be advantageous to gaming establishments because it would allow them to provide skill-based bonus games while still being able to predict their net return.

SUMMARY

The present invention relates to gaming systems and methods of conducting games of chance that may be implemented on multiple linked or networked gaming machines. The gaming machines are networked to enable play of a bonus game in a competitive setting. The bonus game is controlled by a bonus game controller, which is operably coupled to a central server computer. In one embodiment, a method of conducting a game of chance is disclosed. The method includes play of a primary game and an associated, skill-based bonus game. The method may include configuring the bonus game for competitive play by a plurality of players, wherein a final outcome in the bonus game is determined by the skill, strategy, or knowledge of the players. The method may further include configuring the bonus game for competitive play by teams of players. A bonus pool may be generated by allocation of a portion of wagers tendered for play of the primary game and may be awarded based on the final outcome in the bonus game.

In a more specific implementation, the method includes configuring the bonus game to be enabled for play when at least one player achieves a specific outcome or otherwise qualifies by meeting preselected criteria associated with play of the primary game. When the at least one player qualifies for the bonus game, a predetermined number of credits for each qualifying entry may be added to the bonus pool. Since the bonus pool may, as noted above, be generated by play of the primary game, it ensures that the player's skill in the bonus game does not impact the net return of the house in the primary game. The bonus game is played to a final outcome, whereupon the bonus pool is awarded to the winner(s). The bonus game may be a trivia game, a phrase-guessing game, or a maze puzzle.

A system for conducting a game of chance is also provided. The system includes a plurality of gaming machines, each configured to play a primary game of chance and networked for play of a bonus game. The network may include gaming machines at a plurality of mutually remote sites. The bonus game is configured to enable qualified players to use skill, strategy, or knowledge to achieve a final outcome in the bonus game. The bonus game may be funded from a bonus pool that is associated with play of the primary game. The bonus pool is awarded to the player who achieves the final winning outcome.

As used herein, the terms "game," "gaming" and "game of chance" include and encompass not only games having a random or arbitrary outcome, but also such games which also invite or require some player input to the game having at least a potential for affecting a game outcome. Such player input is generally termed "skill" whether or not such input is in actuality beneficial in terms of game outcome.

DETAILED DESCRIPTION

As used herein, the term "bonus game" means a skill-based bonus game, wherein the term "skill-based" is as previously defined and also includes a bonus game that may require the player to use strategy or knowledge. The term "qualified player" means a player who has qualified to participate in the bonus game of the present invention.

The present invention relates to gaming systems and methods where a bonus game is linked to play of a primary game. A player may qualify for the bonus game by achieving a specific outcome in the primary game, or through other criteria associated with play of the primary game, which enables or qualifies the player to wager or otherwise compete against other players in the bonus game. The player's skill, strategy, or knowledge determines a final outcome in the bonus game. The player who achieves the final outcome is awarded a bonus pool that is generated by play of the primary game, thereby ensuring the house's independence from the player's level of skill.

Figure 1:
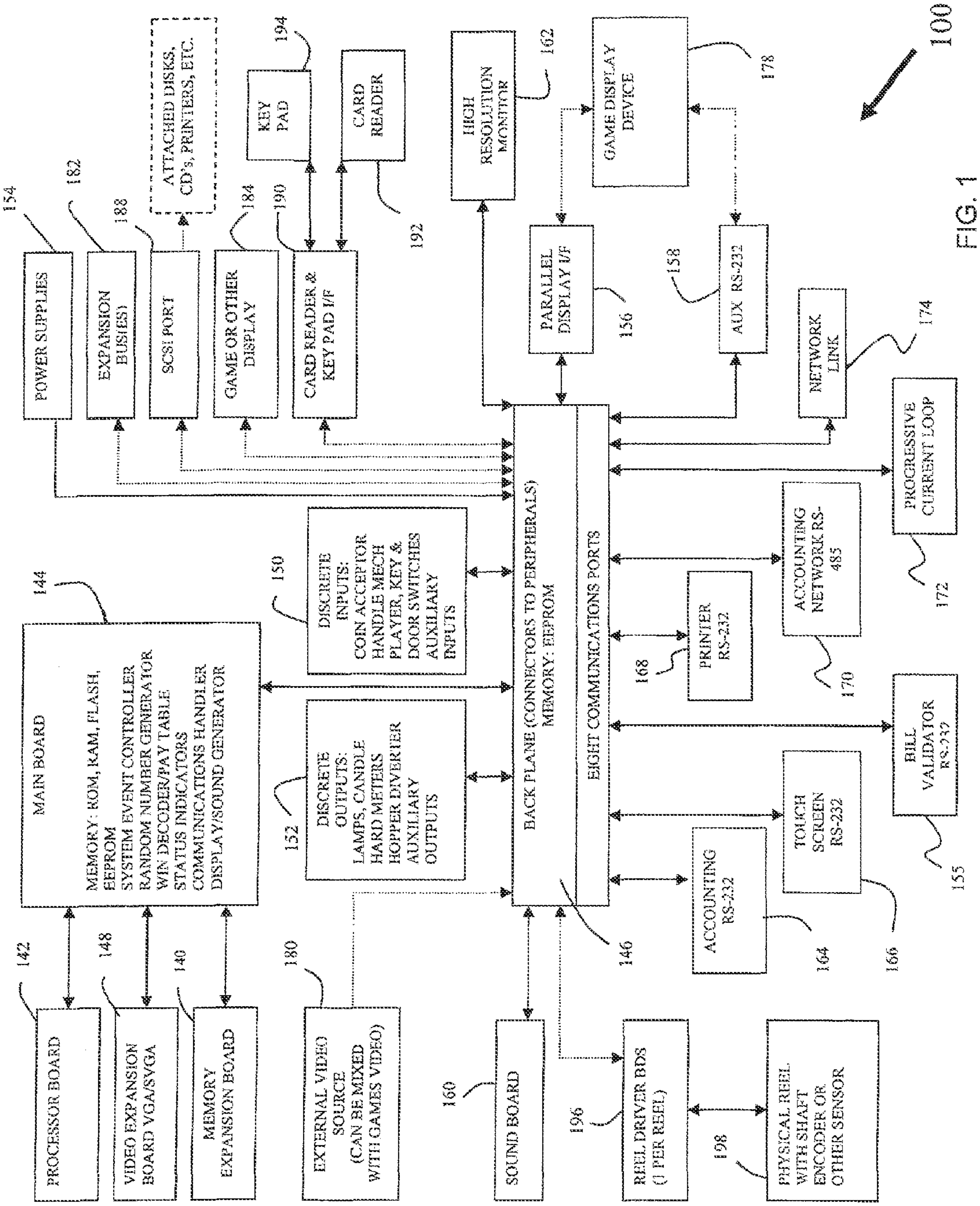
FIG. 1 shows an exemplary gaming machine which may be used to implement the present invention.

FIG. 1 illustrates an exemplary gaming machine 100 for use in implementing the bonus game of the present invention. Gaming machine or device 100 includes a memory board 140, a processor board 142, a main board 144 and a back plane 146 integrally or separately formed. Memory expansion board 140 as well as processor board 142 including a graphics system processor and video expansion board VGA/SVGA 148, are operably coupled to the main board 144. The main board 144 preferably includes memory in the form of ROM, RAM, flash memory and EEPROM (electrically erasable programmable read only memory). In addition, the main board 144 includes a system event controller, a random number generator, a win decoder/pay table, status indicators, a communications handler and a display/sound generator.

The main board 144 is operably coupled to the back plane 146, which may include additional memory, such as in the form of an EEPROM, and connectors to connect to peripherals. Furthermore, the back plane 146 provides a plurality of communication ports for communicating with external peripherals. The back plane 146 provides the coupling between discrete inputs 150 and the processor board 142 and main board 144. Typical examples of elements which provide discrete inputs are coin acceptors, game buttons, mechanical hand levers, key and door switches and other auxiliary inputs. Furthermore, the back plane 146 provides the coupling between discrete outputs 152 and the processor board 142 and main board 144. Typically and by way of example only, elements that provide discrete outputs are in the form of lamps, hard meters, hoppers, diverters and other auxiliary outputs.

The back plane 146 also provides connectors for at least one power supply 154 for supplying power for the processor board 142 and a parallel display interface (PDI) 156 and a serial interface 158 for game display device 178. In addition, the back plane 146 also provides connectors for a sound board 160 and a high-resolution monitor 162. Furthermore, the back plane 146 includes communication ports for operably coupling and communicating with an accounting network 164, a touch screen 166 (which may also serve as a game display device), a bill validator 155 incorporated in a currency (bill) acceptor, a printer 168, an accounting network link 170, a progressive current loop 172 and a network link 174.

The back plane 146 optionally includes connectors for external video sources 180, expansion buses 182, game or other displays 184, an SCSI port 188 and an interface 190 for at least one card reader 192 (debit/credit, player card, etc.) and key pad 194. The back plane 146 may also include means for coupling a plurality of reel driver boards 196 (one per reel) which drive physical game reels 198 with a shaft encoder or other sensor means to the processor board 142 and main board 144 if a gaming device 100 is configured for play of a reel-type game. Of course, the reels may be similarly implemented electronically by display as video images, technology for such an approach being well known and widely employed in the art. In such an instance, reel driver boards 196 and physical game reels 198 with associated hardware are eliminated and the game outcome generated by the random number generator on main board 144 is directly displayed on a video game display 184 and, optionally, on a separate game display device 178, as known in the art. Other gaming machine configurations for play of different wagering games such as video poker games, video blackjack games, video Keno, video bingo or any other suitable primary games are equally well known in the art. It will also be understood and appreciated by those of ordinary skill in the art that selected components of gaming device 100 may be duplicated for play of a bonus game or event in accordance with the present invention, in that at least a separate board with a second random number generator may be employed, with associated peripherals and links thereto, for play of the bonus game. In the conventional situation wherein the bonus game of the present invention may be operably coupled as a "top box" or otherwise associated with a conventional, existing gaming machine configured for play of a base game, many of the components illustrated in FIG. 1 and described with respect thereto will be duplicated, including separate software and associated memory for conducting play of the bonus game with associated pay tables for the bonus awards.

Gaming machine 100 may be used to play the primary game that activates the bonus game of the present invention and as a terminal for play of the bonus game. This gaming machine 100 may be configured as a reel-type gaming machine, a video gaming machine that simulates reels or enables play of a card game, or any other type of mechanical or electronic gaming device known in the art for play of the primary game.

Figure 2:
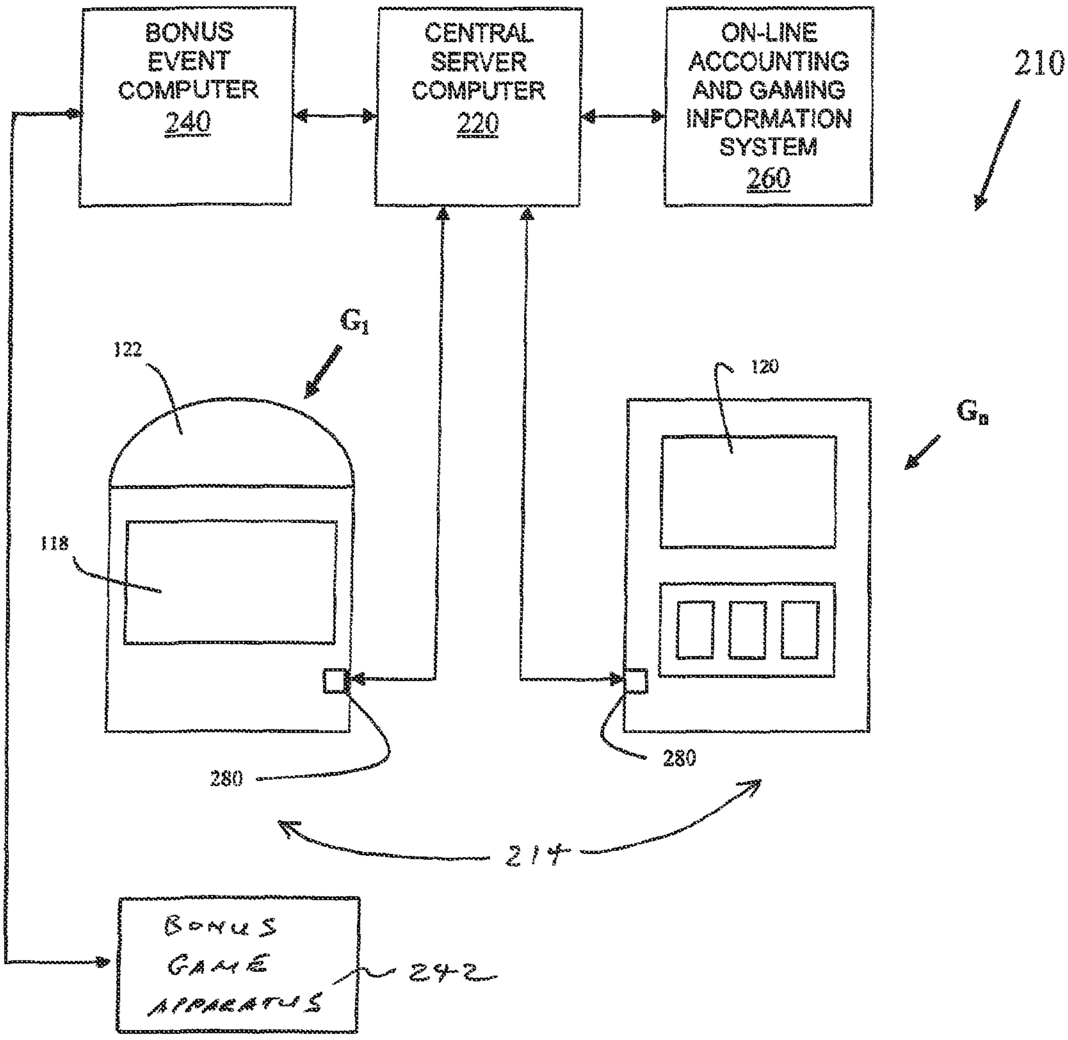
FIG. 2 is a diagrammatic representation of an exemplary competitive bonus gaming network which may be used to implement the present invention.

In implementation of the present invention, the gaming machines offering play of the bonus event of the present invention may be deployed, as schematically depicted in FIG. 2, in a gaming network 210 including a central server computer 220 operably coupled to a bank 214 or other plurality of gaming machine $G_1, G_2 \ldots G_n$ which may include both electronic and reel-type gaming machines and which may be configured, by way of example only, as gaming machines 100. It is notable that, unless the gaming network 210 is configured for progressive play, a variety of different makes of gaming machines $G_1, G_2 \ldots G_n$ offering widely different games may be incorporated in gaming network 210, since the bonus event operates independently of the primary game on each gaming machine. The central server computer 220 automatically interacts with a plurality of gaming machines $G_1, G_2 \ldots G_n$ to activate a bonus event.

More specifically, and again referring to FIGS. 1 and 2, the gaming network 210, which may comprise a competitive bonus gaming network, includes a central server computer 220, a bonus event computer 240 and a plurality of gaming machines $G_1, G_2 \ldots G_n$. Each gaming machine $G_1, G_2 \ldots G_n$ includes a controller assembly 280 operably coupled to the central server computer 220 and is comprised of a controller unit designed to facilitate transmission of signals from each individual gaming machine $G_1, G_2 \ldots G_n$ to central server computer 220 for monitoring purposes. In addition, the controller assembly 280 includes a network interface board fitted with appropriate electronics for each specific make and model of each individual gaming machine $G_1, G_2 \ldots G_n$.

Referring to FIG. 2, in electronic video games, the central server computer 220 is operably coupled to at least one video game display element 118 as shown at the left-hand side of FIG. 2 and sequesters a portion of the video game display element 118 for displaying video attract sequences to attract potential players. Video game display element 118 may be used for display of both the primary and bonus games. Where the gaming network 210 includes reel-type gaming machines $G_1, G_2 \ldots G_n$, as shown at the right-hand side of FIG. 2, the central server computer 220 may be operably coupled to at least one active display element 120 so that potential players receive a clear indication of attract sequences and the active display element 120 may be used as a video display for the bonus game. As shown at the left hand side of FIG. 2, the gaming machines $G_1, G_2 \ldots G_n$ may also be provided with a second video display element 122 as an alternative to sequestering a portion of the video game display element 118 for displaying video attract sequences and the bonus game. In addition, the central server computer 220 may include sound-generating hardware and software for producing attractive sounds orchestrated with the video attract sequences at each of gaming machines $G_1$, $G_2$ . . . $G_n$ if such is not already incorporated therein. The games support input and output between the player and the games for such devices as heads up display, joystick, keyboard, mouse and data glove via interface modules connected through the expansion bus or buses 182 and SCSI port 188.

The attractive multimedia video displays and dynamic sounds may be provided by the central server computer 220 by using multimedia extensions to allow gaming machines $G_1$, $G_2$ . . . $G_n$ to display full-motion video animation with sound to attract players to the machines. During idle periods, the gaming machines $G_1$, $G_2$ . . . $G_n$ preferably display a sequence of attraction messages in sight and sound. The videos may also be used to market specific areas of the casino and may be customized to any informational needs.

Furthermore, the gaming network 210 includes bonus event computer 240 operably coupled to the central server computer 220 for scheduling bonus parameters such as the type of bonus game, pay tables and players. The functions of central server computer 220 and bonus event computer 240 may, of course, be combined in a single computer. The bonus event computer 240 may include a database that stores and provides the bonus games of the present invention, which may be downloaded in batch or on demand depending on the type of bonus game. The bonus games may be categorized in the database based on the difficulty level and topic of the game. The difficulty of the bonus game presented to the qualified player(s) may be monitored or controlled by the bonus event computer 240. In addition, the database must be secure so that players do not view the game before the bonus game is activated. Furthermore, the database must be augmented, revised and updated regularly to ensure that qualified players are presented with new games each time they qualify for the bonus game.

Figure 3:
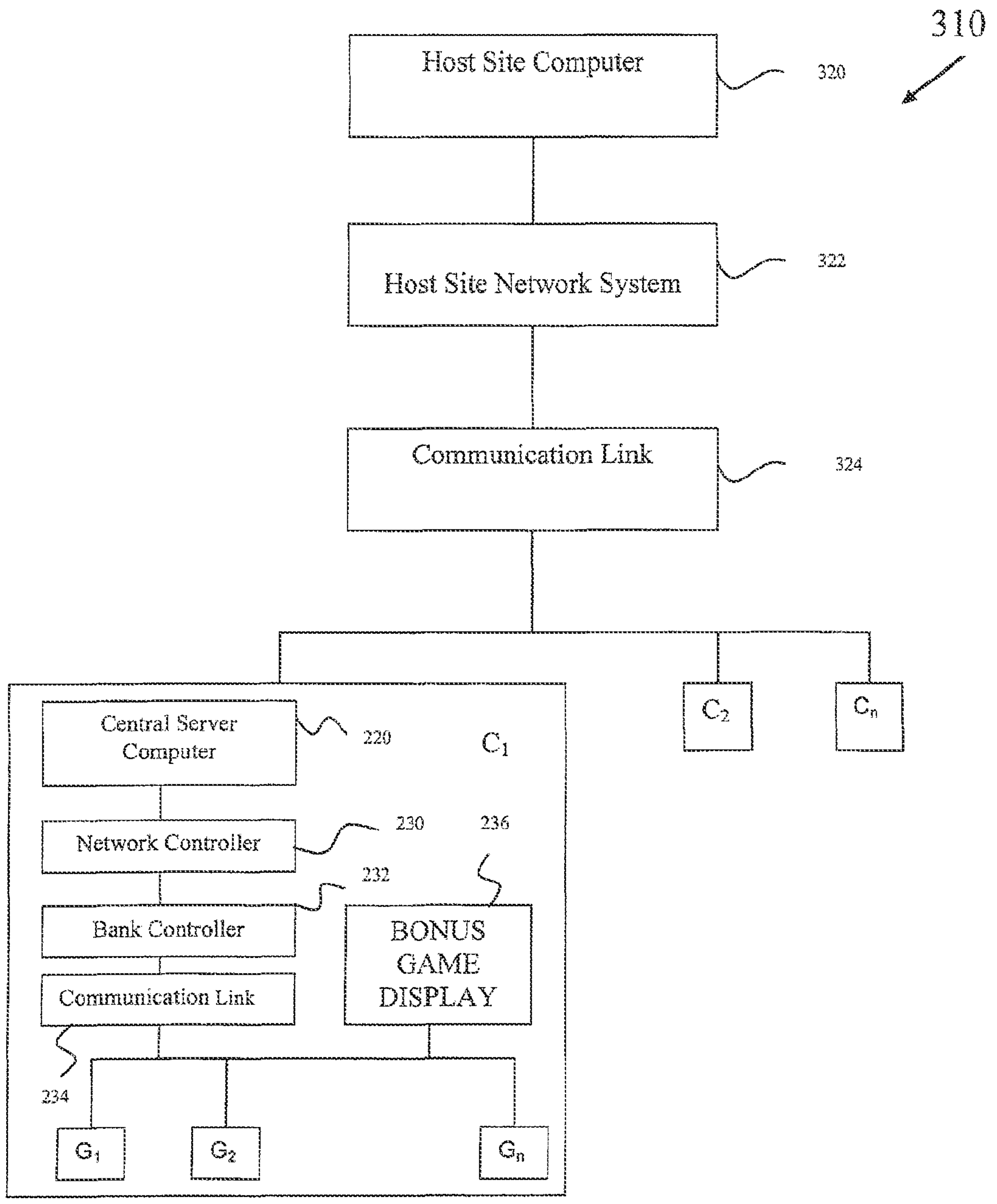
FIG. 3 illustrates an exemplary competitive bonus game system which may be used to implement the present invention.

The bonus game may be conducted solely on the bonus event computer 240 and visible manifestations of the bonus game, including the final outcome thereof, are displayed as video images on high-resolution monitor 162, game display device 178, or at least one bonus game display 236 (FIG. 3). Alternatively, a separate bonus game apparatus 242 for providing an actual, physical implementation of the bonus game, such as a live trivia game or a live game of chess, may be operably coupled to bonus event computer 240. Bonus event computer 240 may be employed to initiate the bonus game on bonus game apparatus 242 and to receive communications indicative of the course of the bonus game and its final outcome for determination of winners and losers and issuance of bonus awards resulting from winning wagers. Preferably, the gaming network 210 further includes a real-time or on-line accounting and gaming information system 260 operably coupled to the central server computer 220. The accounting and gaming information system 260 includes a player database for storing player profiles, a player tracking module for tracking players and a pit, cage and credit system for providing automated casino transactions.

As previously implied, a bank 214 of gaming machines $G_1$, $G_2$ . . . $G_n$ may be networked together in a progressive configuration, as known in the art, wherein a portion of each wager used to initiate the primary game may be allocated to bonus awards or bonus pools. The bonus pool may also comprise a predetermined, fixed number of credits that are added for each qualifying entry. In addition, and referring to FIG. 3, a host site computer 320 is coupled to a plurality of the central server computers 220 at a variety of mutually remote casino or other gaming sites $C_1$, $C_2$ . . . $C_n$ for providing a multi-site linked automated bonus gaming system 310 which, optionally, may be configured for progressive play.

Preferably, the host site computer 320 will be maintained for the overall operation and control of the bonus gaming system 310. The host site computer 320 includes a host site network system 322 and a communication link 324 provided with a high-speed, secure modem link for each individual casino site $C_1$, $C_2$ . . . $C_n$.

Each casino or other gaming site $C_1$, $C_2$ . . . $C_n$ includes the central server computer 220 provided with a network controller 230 which includes a high-speed modem operably coupled thereto. Bidirectional communication between the host site computer 320 and each casino site central server 220 is accomplished by the set of modems transferring data over communication link 324.

A network controller 230, a bank controller 232 and a communication link 234 are interposed between each central server computer 220 and the plurality of networked gaming machines $G_1$, $G_2$ . . . $G_n$ at each casino site $C_1$, $C_2$ . . . $C_n$. In addition, the network controller 230, the bank controller 232 and the communication link 234 may optionally be interposed between each central server computer 220 and at least one separate bonus game display 236 at each casino site $C_1$, $C_2$ . . . $C_n$. Moreover, the bonus gaming system 310 may include hardware and software to loop back data for in-machine meter displays to communicate with bonus event award insert areas on gaming machines $G_1$, $G_2$ . . . $G_n$.

By way of exemplary implementation of the present invention, the bank 214 of gaming machines $G_1$, $G_2$ . . . $G_n$ may be connected or linked to form a competitive bonus gaming network 210. The bank 214 of gaming machines $G_1$, $G_2$ . . . $G_n$ may also be connected or linked to the at least one bonus game display 236. The bank 214 of gaming machines is represented in FIG. 2 as $G_1$ through $G_n$, where $G_1$ is depicted as an electronic slot machine and $G_n$ is depicted as a reel-type slot machine. Although only two, networked gaming machines are illustrated in FIG. 2, it will be readily apparent to one of ordinary skill in the art that any number of gaming machines $G_1$, $G_2$ . . . $G_n$ may be used in the present invention. For example, in a preferred embodiment, the bank 214 of gaming machines comprises fifty or more gaming machines $G_1$, $G_2$ . . . $G_n$, where "n" equals at least fifty, connected or linked together.

Bonus game display 236 may be configured as a relatively large, liquid crystal display ("LCD") screen or a plurality of such screens. The screen(s) is/are relatively large in comparison to the high-resolution monitor 162 or other game display device 178 of gaming machine 100. The bonus game display(s) 236 may be positioned in an area above the gaming machines $G_1$, $G_2$ . . . $G_n$ so that the screen(s) is/are visible to all players at the bank 214 of gaming machines $G_1$, $G_2$ . . . $G_n$. Bonus game display 236 may comprise other types of display screens known in the art including cathode ray tube (CRT) screens, plasma display screens, and/or screens based on light-emitting diode (LED) technology. Bonus game display 236 may be a display screen configured for multiple uses and/or concurrent display of other casino-sponsored information. For example, bonus game display 236 may be used in association with a Sports Book venue of the casino during periods in which bonus game display 236 is temporarily not used for the purposes of the present invention.

Gaming machines $G_1$, $G_2$ . . . $G_n$ may be connected to bonus game display 236 through communication link 234. Communication link 234 may be any of a variety of communication links known in the art, including, but not limited to: twisted-pair wire, coaxial cable, fiber optic, Ethernet, token ring, bus line, Fibre Channel, ATM, standard serial connections, LAN, WAN, Intranet, Internet, radio waves, or other wireless connections.

In the bonus game of the present invention, the player of the primary game at one of gaming machines $G_1, G_2 \ldots G_n$ qualifies for the bonus game by achieving a specific outcome or by meeting other selected criteria associated with play of the primary game. Play of the bonus game is based on the player's level of strategy, skill, or knowledge. In currently preferred embodiments, these bonus games may be a trivia game, a phrase-guessing game, or a maze. However, other strategy- or skill-based games, as previously described, may be used.

In order to qualify for the bonus game, a special symbol or element may be provided on one or more reels of the slot machine of the primary game. These symbols are referred to as "event symbols." The player must achieve a predetermined number of event symbols, the specific outcome, to participate in the bonus game. In one preferred embodiment, the event symbol is a "Logo" symbol and the player must achieve two "Logo" symbols to qualify for the bonus game. However, it will be readily apparent to one of ordinary skill in the art that the bonus game may be activated by other event symbols and that the number of event symbols necessary to activate the bonus game may vary, depending on how frequently the gaming establishment wants the bonus game activated.

Other ways to qualify for the bonus game may also be contemplated. For instance, players may qualify by achieving multiple specific outcomes in the primary game, playing the primary game a preselected number of times, playing the primary game multiple times for a preselected duration of time, or wagering a preselected sum over a plurality of plays of the primary game.

It is possible that multiple players may simultaneously qualify for the bonus game. It is also possible for one player to win multiple qualifications into the bonus game. That player may then use the multiple qualifications to increase his or her stake in the bonus game, thereby allowing the player to receive two or more shares of the bonus pool if he or she ultimately wins the game. The multiple qualifications may also be converted to normal award categories once the player has qualified for the bonus game. Alternatively, the player may reserve the multiple qualifications to enter subsequent rounds of the bonus game or, depending on the type of bonus game, the player may receive multiple entries into the bonus game. For example, the player may use his or her multiple qualifications to take multiple guesses at the correct answer in the trivia game or to guess multiple letters in the phrase-guessing game.

Upon qualifying for the bonus game, the player is notified of his opportunity to participate by an interaction with his gaming machine 100, which is one of the bank 214 or other plurality of gaming machines $G_1, G_2 \ldots G_n$. This interaction may occur through the appearance of a message on a touch screen 166 of gaming machine 100. Once activated, the bonus game may start immediately. However, the bonus game may also start after a certain number of players have qualified for the bonus game, when the bonus pool reaches a predetermined level, at fixed or random time intervals (for example, the bonus game may be activated one-half hour after the conclusion of the last bonus game or every hour on the half hour), randomly throughout the day, when a predetermined number of primary games in the bank 214 have been played, or in response to a game outcome.

When the player has qualified for the bonus game, the predetermined number of credits for each qualifying entry may be added to the bonus pool. The number of credits added to the bonus pool may be calculated to maintain the net return of the house in the primary game and will vary for each type of bonus game. This design allows a bonus game based on skill to be used by ensuring the house's independence from the player's skill. Since the bonus pool in this exemplary embodiment is determined by the fixed number of credits for each qualifying entry, the house's net return in the primary game is not affected by the player's skill. The bonus game is played to the final outcome, whereupon the bonus pool is awarded to the winner(s). Depending on the type of bonus game, the bonus pool may be awarded to one player or divided among players that achieved the final outcome. It is also contemplated that the house may receive a percentage of the credits added to the bonus pool.

The bonus game is selected from the database according to the desired difficulty level and/or topic. The difficulty or topic of the bonus game presented to the qualified player(s) may be determined randomly, by player preference, based on past performance, or based on status in the current bonus game.

When the bonus game is ready to start, the players currently qualified to participate may be queried through the touch screen 166 or other communication element associated with gaming machine 100 as to whether they wish to participate in the bonus game. Alternatively, the players may be automatically entered in the bonus game and advised of their entry through the touch screen 166 and/or an audio signal, such as a trumpet blast, bells, music, etc. Once the bonus game has started, the players may have a certain amount of time within which to play the bonus game. However, if the time is not specifically limited, the final outcome in the bonus game may be determined by the player who most quickly finishes the bonus game to a winning outcome. The players play the bonus game by interacting with touch screen 166 or other communication elements associated with gaming machine 100, as is known in the art.

Multiple bonus games may be in play simultaneously, allowing qualified players to choose the bonus game in which they wish to participate. The multiple bonus games may be of different types or difficulty levels. Qualified players may freely choose to play any of the multiple games. However, in some instances, the players may be required to achieve other specific outcomes or earn the right to choose between the multiple games. For example, the players may be required to accumulate a specific number of credits or win at lower difficulty levels before earning the right to choose the bonus game in which they wish to participate.

When teams of players are enabled to compete against one or more other teams, such a configuration may actually speed play of a round of bonus game play by enabling input from more than one player. Further, it is contemplated that teams may be comprised of an odd number of players so as to enable a "vote" for a particular answer or strategy by the team, and team members may be enabled to acquiesce to another team member's proposed response, rather than submit one of their own. Still further, the bonus game may be configured so that team members may be able to mutually communicate the identities of responses they know to be incorrect or ill-advised, so as to enable the team to arrive at a more preferred response.

Certain bonus games may be configured for team play. For instance, qualified players may collaborate or participate in the bonus game as a team. Some bonus games may only be configured for team participation, while other games may allow both one-person and team participation. The teams may be determined randomly, by player choice, by game outcomes, or by which gaming machines are being played. For instance, gaming machines 100 located adjacent to each other (for example, in a bank) or in a certain location in the casino may be assigned to one team while gaming machines 100 in a different location are assigned to a second team. The number of players allowed on each team may vary and may be related to the type of bonus game.

In one approach, the bonus game is a multiple-choice, trivia game. For each qualifying entry in the trivia game, a predetermined number of credits are added to the bonus pool. A trivia question selected from the appropriate category and difficulty level of the database is then downloaded from the database of questions. The qualified players are presented with the trivia question and five possible answers, which include one correct answer. The qualified players may all be presented with the same question or a different question. If all the qualified players are presented with the same question, that question may be displayed on high-resolution monitor 162, game display device 178, and/or bonus game display device 236. However, if the qualified players are presented with a different question, the question may be displayed on the high resolution monitor 162 or game display device 178 associated with their individual gaming machines 100.

The final outcome in the bonus game is determined by the qualified players' answers to the trivia question, which are based on each player's level of skill or knowledge. If one player correctly answers the question, that player may be awarded the entire bonus pool. However, if more than one player correctly answers the question, the bonus pool may be divided equally between those players or the player who most quickly answers the question may receive a larger portion of the bonus pool. If none of the players correctly answers the question, the credits in the bonus pool may be applied to the next round of the bonus game. The player may also choose to ignore or cancel the question if he or she does not want to participate in the bonus game.

Alternatively, a player may be immediately presented with a trivia question and five possible answers. In this embodiment, the bonus game may be played at a number of different levels or statuses. For example, the status indicator may be a ladder with the rungs of the ladder representing different status levels. A character or other identifier may be used to display the player's position on the status indicator. For example, the identifier may be a symbol of a person, which can be displayed on the rungs of the ladder. The player may elect to take a prize in lieu of participating in the bonus game. If the player elects to participate in the bonus game but does not answer the question, by either ignoring or canceling the question, he or she may maintain his or her number of points or position on the status indicator. If the player incorrectly answers the question, he or she may be penalized by deducting points or moving the player down on the status indicator ladder. If the player correctly answers the question, he or she may receive a certain number of points or move an established increment down on the status indicator ladder. The bonus game may run for a predetermined time, through a predetermined number of questions, or until one of the players reaches a set number of points or position on the status indicator ladder. The bonus pool may be awarded to the player with the highest number of points or position on the status indicator ladder.

In still other embodiments of the trivia game, different questions may have different numbers of points depending on, for example, the difficulty of the question. In addition, the bonus pool may not be distributed if too many players correctly answer the question. For example, the bonus pool may not be distributed if 25% of the players correctly answer the question. Instead, the players may be presented with a second, more difficult question. Furthermore, multiple trivia games, each with different difficulty levels, may be in progress simultaneously. Qualifying players may choose the difficulty level of the bonus game in which they wish to participate.

In another approach, a strategy or puzzle game is provided as the bonus game. Upon qualifying for the bonus game, each player earns a single move or guess in the bonus game. Points may be awarded to the player's local credit meter for each correct move or guess. The player who completes the puzzle first or achieves the greatest number of points may be awarded the bonus pool. The bonus pool may also be awarded to the qualified player who most quickly solves the puzzle.

In one currently preferred embodiment, the bonus game is a multiple-choice, trivia game referred to as the "Top of the Ladder" trivia game. A bank 214 of fifty or more gaming machines is linked together and connected to a bonus event computer 240. The primary game on gaming machines 100 comprises a 5-reel, multi-line spinning reel game. The "Logo" symbol is represented, for example, on the first and last (left- and right-hand most) reels. Along an edge of the display of a game display device 178 of each individual gaming machine 100 is displayed the status indicator, a ladder, with a prize amount indicated for each rung of the ladder. The number of rungs on the ladder may vary depending on the type of bonus game being played. The prize amount increases progressively with each higher rung of the ladder, with the top rung of the ladder being a progressive bonus pool with a dynamic prize amount provided by the bonus event computer 240. The identifier on the ladder, such as a symbol of a person, starts off at the lowest rung and is moved up the ladder as the player correctly answers a plurality of questions. The player's status in the bonus game is indicated by the position of the symbol of the person on the ladder.

In order to qualify for the bonus game, the player must achieve two "Logo" symbols on a pay line. Gaming machine 100 is configured so that the reels thereof do not have "Logo" symbols within two stops of each other, thereby ensuring that if two "Logo" event symbols appear on game display device 178, the "Logo" symbols will be located on only one pay line. The primary game may, for example, offer the following nine pay lines, where the "X's" are employed to indicate each pay line configuration:

| | | | | |
|---|---|---|---|---|
| OOOOO | XXXXX | OOOOO | XXOOO | OOOXX |
| XXXXX | OOOOO | OOOOO | OOXOO | OOXOO |
| OOOOO | OOOOO | XXXXX | OOOXX | XXOOO |
| XOOOO | OOXXO | OOOOX | OXXOO | |
| OXOOX | OXOOX | XOOXO | XOOXO | |
| OOXXO | XOOOO | OXXOO | OOOOX | |

Figure 4:
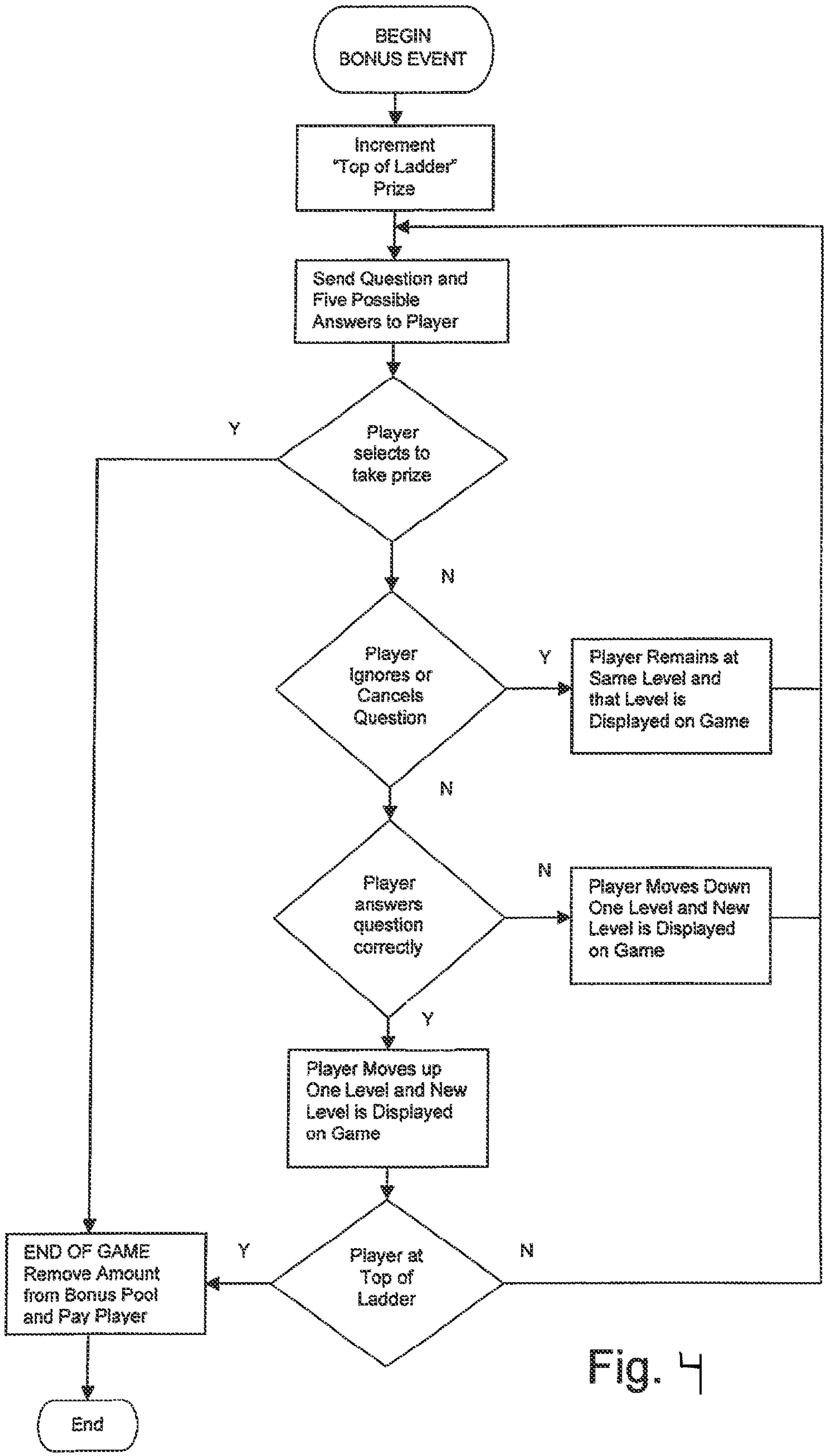
FIG. 4 is a flowchart showing a play sequence according to an exemplary embodiment of the present invention.

A flowchart of an exemplary play sequence for a multiple-choice, trivia game of the first currently preferred embodiment is shown in FIG. 4. After qualifying for the bonus game, the gaming machine 100 signals the bonus event computer 240 and the “Top of the Ladder” trivia game is implemented. The predetermined number of credits for each qualifying entry is added to the progressive bonus pool. The total amount of the progressive bonus pool is displayed on the top rung of each gaming machine’s ladder. Typically, the total amount is a fixed amount consistent with the odds of obtaining that game outcome.

The bonus event computer then sends a question and five possible answers to the player who qualified for the bonus game. The difficulty of the question is determined by the rung upon which the player’s identifier is positioned, with the difficulty increasing the further up the ladder the identifier is positioned. The question and possible answers are displayed either on the player’s high-resolution monitor 162, game display device 178, or bonus game display 236. The player may choose to answer the question, take the prize associated with his current ladder position, or ignore or cancel the question. The player has twenty (20) seconds in which to answer a question.

If the player chooses to take the prize for his or her current position, that amount may be removed from the bonus pool and paid out to the player, and the bonus game ends, at least for that player. If the player cancels the question, or does not answer within the required time, the player may remain at his or her current ladder position. If the player correctly answers the question, he or she may move up one rung on the ladder. However, if the player answers incorrectly, he or she may be moved down one rung. The new positions on the ladder are displayed by moving the person symbol, or identifier, up or down. The final outcome in the bonus game is determined when one player reaches the top rung on the ladder. This player is awarded the progressive bonus pool. The identifiers on all of the gaming machines 100 are then reset to the lowest rung of the ladder in preparation for a new bonus game.

Players may sometimes choose to leave their gaming machines 100 with zero credits while the identifier is positioned above the lowest rung on the ladder. If the gaming machine is left in this situation for more than five minutes, the identifier may be moved down the ladder one rung or increment. The identifier may be moved down an additional rung every five minutes until the identifier reaches the lowest rung on the ladder. This feature gives passersby or potential players in the casino incentive to search for an unoccupied gaming machine 100 where the identifier is already partially up the ladder. Of course, if a player tracking system is employed, a player may leave a gaming machine 100 and “remove” his character with an associated place on the status indicator ladder and return later for play at the same or another gaming machine 100 to recommence play from the same ladder rung.

In a second exemplary embodiment, the bonus game is a phrase-guessing game, similar to the WHEEL OF FORTUNE® game known in the art. A bank of approximately ten gaming machines 100 is linked together and connected to the bonus event computer 240. The gaming machines are also connected to at least one bonus game display 236, such as a 42-inch plasma screen. The bonus event computer 240 has a periodically updated database containing a large number of stored phrases. Each phrase is categorized into a different difficulty level. In addition, each letter of the alphabet is associated with a fixed number of points according to Table 1.

TABLE 1

| | |
|---|---|
| 5 points: | J Q V W X Y Z |
| 3 points: | B C D F G H K L |

TABLE 1-continued

| | |
|---|---|
| 2 points: | D M N P R S T |
| 1 point: | A E I O U |

Once the bonus game is triggered, a phrase of the appropriate difficulty level is randomly chosen from the database. The bonus game display 236 initially displays blank letter positions, with one position displayed for each letter in the phrase. The bonus game display 236 also displays a “Bonus Pool” meter that reflects the amount to be awarded in the bonus game and is initially set to zero. Each gaming machine 100 comprises a video display spinning reel primary game and a ‘My Points’ meter that displays the number of points that the player has received in the bonus game. One of the event symbols on the reels is a “Your Turn” symbol. If the player receives the “Your Turn” symbol on one of his or her reels, twenty credits are added to the “Bonus Pool” meter and the player may guess a letter in the phrase. If the player guesses a letter that occurs in the phrase, the number of points associated with that letter is added to his “My Points” meter for each occurrence of the letter. In addition, the letter(s) appear(s) in the appropriate positions on the bonus game display 236.

When all the letters in the phrase have been guessed, thereby completing the phrase, the player with the most points on his “My Points” meter is awarded the bonus pool. It is also contemplated that the player who guessed the last letter(s) in the phrase may receive a portion of the bonus pool. After the bonus pool has been awarded, the bonus pool meter is reset to zero and a new phrase appears when the next bonus game is activated.

Additional approaches to this embodiment exist. For example, certain game outcomes may enable the player to make more than one guess as to the letters in the phrase. In addition, this embodiment may comprise more than one phrase, each phrase being associated with its own “Bonus Pool” meter. Displaying multiple phrases may add to the continuity of the game because at any given time, there would typically be at least one partially completed phrase from which players may choose. Each phrase may be displayed in separate areas of the bonus game display 236. Upon receiving the “Your Turn” symbol, the player may choose the phrase in which he or she would like to guess a letter.

In yet another exemplary embodiment, the bonus game is a maze-solving game entitled “A-Mazing Cash.” A group of twenty or more gaming machines is linked together and connected to the bonus event computer 240. The primary game is a 9-reel (3×3 array), eight pay line video slot machine with touch screen 166. One of the event symbols on each reel is a “MazeRunner” symbol. If the player receives five or more “MazeRunner” symbols, he or she qualifies for the bonus game. The bonus game begins when, for example, at least five gaming machines 100 have qualified. Once the reels of all five qualified gaming machines have finished spinning, a brief introduction to the bonus game is presented. Then, a maze pattern is displayed on the high resolution monitor 162 or game display device 178 of the five machines. The maze may also be displayed on bonus game display 236 so that non-participants in the bonus game may view the progress of the game.

A “MazeRunner” character is located in the lower left corner of the maze. The qualified players place their fingers on the “MazeRunner” and drag him through the maze. The first player to reach the upper right corner of the maze, thereby completing the maze, is awarded 300 credits. The maze presented to the qualified players is identical on all five gaming machines in a particular round of the bonus game. However, a different maze is displayed in each round so that frequent players of the bonus game are not familiar with the maze. Typically, the maze is algorithmically designed but it may be downloaded from a look-up table in a database including a large number of mazes. It is also contemplated that the qualified player may have the option to take a direct award of 50 credits in lieu of participating in the bonus game. In this situation, the player gives up the possibility of winning 300 credits in return for a guaranteed award of 50 credits. This feature may be necessary in situations where too few players have qualified for the bonus game or if a player wishes to leave the bonus game without participating.

While the exemplary embodiments disclose using at least one gaming machine G located at one casino or other gaming site, it is possible for remote players of the primary game to qualify for the bonus game of the present invention using the bonus gaming system 310 previously described. For instance, these remote players may play the primary game on networked gaming machines at mutually remote sites within a casino, at a plurality of mutually remote casino sites, or at virtual gaming sites such as personal computers or other device serving as terminals. As is known in the art, software to play the primary game may be downloaded onto a personal computer.

Upon qualifying for the bonus game, which may occur in a manner similar to qualification on a gaming machine G located at the casino site, the player may be provided with an opportunity to wager on the bonus game. It is contemplated that the software downloaded to the personal computer may include the bonus game of the present invention or sufficient communication capability to interact in substantially real time with a host server. The existence and further development of broadband communication links including DSL, cable, and even broadband wireless may enable remote play from a variety of locations using diverse hardware such as hand-held wireless terminals at a casino, personal digital assistants (PDAs), etc. Further, the bonus game may be posted on an Internet site associated with the casino or other sponsor of the bonus game. The bonus game is accessible to the player if the specific outcomes are achieved in the primary game. The player may participate in the bonus game through his personal computer terminal via the Internet, such as through streaming audio or video.

As shown in FIG. 3, and previously described, bonus gaming system 310 includes a host site computer 320 operably coupled to multiple central server computers 220, which may be located at a variety of remote casino or other gaming sites. Alternatively, central server computers 220 may be used to interface with a plurality of personal computers, PDAs, or other terminals. Preferably, the host site computer 320 will be maintained for the overall operation and control of the competitive bonus gaming system 310. Each physical or virtual gaming site, represented as $C_1, C_2 \ldots C_n$ in FIG. 3, includes the network controller 230, the bank controller 232, and the communication link 234 interposed between each central server computer 220 and the multiple gaming machines schematically illustrated as $G_1, G_2 \ldots G_n$. As alluded to above, gaming machines $G_1, G_2 \ldots G_n$ may comprise conventional gaming machines 100, personal computers, wired or wireless terminals, PDAs, or a combination thereof. Thus, the term "gaming machine" is used herein in its broadest sense and encompasses any device used as a terminal by at least one player to participate in the bonus game.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention is claimed as follows:

1. A gaming system, said gaming system comprising:
- a plurality of gaming machines, each of said gaming machines including:
  - a display device;
  - an input device;
  - a gaming machine processor; and
  - a memory device which stores a plurality of instructions, which when executed by the gaming machine processor, cause the gaming machine processor to operate with the display device and the input device to:
    - (a) enable a player to place a wager on a play of a primary game; and
    - (b) display said play of the primary game; and
- a central controller configured to communicate with each of the gaming machines, said central controller programmed to:
  - (a) determine whether to initiate a play of a bonus game for a plurality of the players of the gaming machines, said bonus game associated with a plurality of sets of selections, each set including a plurality of selections, wherein at least one of said selections of the set is associated with a successful outcome and at least one of said selections of the set is associated with an unsuccessful outcome; and
  - (b) for said play of the bonus game:
    - (i) select and cause a display of one of said sets of selections;
    - (ii) receive, from each of said plurality of the players of the gaming machines, a selection of one of the selections of the displayed set;
    - (iii) determine whether any of said plurality of the players of the gaming machines selected the selection associated with the successful outcome;
    - (iv) if a number of players who selected the selection associated with the successful outcome meets or exceeds a designated number of players, repeat (i) to (iii) at least once; and
    - (v) if the number of players who selected the selection associated with the successful outcome does not meet or exceed the designated number of players, cause an award to be provided to one or more of said players who selected the selection associated with the successful outcome, if any.

2. The gaming system of claim 1, wherein, if the award is to be provided, the award is divided among said players who selected the selection associated with the successful outcome.

3. The gaming system of claim 1, wherein the designated number of players is selected from the group consisting of: all of said plurality of the players of the gaming machines, less than all of said plurality of the players of the gaming machines, a randomly determined number of players, and a predetermined number of players.

4. The gaming system of claim 1, wherein the bonus game is associated with a plurality of trivia questions, each of said trivia questions associated with one of said plurality of sets of selections, wherein at least one of said selections of the set is associated with a correct answer to said trivia question and at least one of said selections of the set is associated with an incorrect answer to said trivia question, and said central controller is configured, if the determination is made to initiate the bonus game, to:

(i) select and cause a display of one of said plurality of trivia questions and the set of selections associated with said trivia question;

(ii) receive, from each of said plurality of the players of the gaming machines, a selection of one of the selections from the set of selections associated with the displayed trivia question;

(iii) determine whether any of said plurality of the players of the gaming machines selected the selection associated with the correct answer to the displayed trivia question;

(iv) if a number of players who selected the selection associated with the correct answer meets or exceeds a designated number of players, repeat (i) to (iii) at least once; and (v) if the number of players who selected the selection associated with the correct answer does not meet or exceed the designated number of players, cause an award to be provided to one or more of said players who selected the selection associated with the correct answer, if any.

5. The gaming machine of claim 4, wherein the selected trivia question and set of selections associated with said trivia question have a difficulty level selected according to a criterion, the criterion being independent of player preference.

6. The gaming system of claim 4, wherein the criterion is selected from the group consisting of: a random selection, a past performance of one or more of the players, and a status in the bonus game.

7. A method of operating a gaming system, said method comprising:

(a) for each of a plurality of gaming machines:

(i) causing at least one gaming machine processor to execute a plurality of instructions stored in at least one memory device to operate with at least one input device to enable a player to place a wager on a play of a primary game; and (ii) causing the at least one gaming machine processor to execute the plurality of instructions to operate with at least one display device to display said play of the primary game;

(b) causing at least one central controller to determine whether to initiate a play of a bonus game for a plurality of the players of the gaming machines, said bonus game associated with a plurality of sets of selections, each set including a plurality of selections, wherein at least one of said selections of the set is associated with a successful outcome and at least one of said selections of the set is associated with an unsuccessful outcome; and (c) for said play of the bonus game:

(i) causing the at least one central controller to select and cause a display of one of said sets of selections;

(ii) causing the at least one central controller to receive, from each of said plurality of the players of the gaming machines, a selection of one of the selections of the displayed set;

(iii) causing the at least one central controller to determine whether any of said plurality of the players of the gaming machines selected the selection associated with the successful outcome;

(iv) if a number of players who selected the selection associated with the successful outcome meets or exceeds a designated number of players, repeating (i) to (iii) at least once; and (v) if the number of players who selected the selection associated with the successful outcome does not meet or exceed the designated number of players, causing the at least one central controller to cause an award to be provided to one or more of said players who selected the selection associated with the successful outcome, if any.

8. The method of claim 7, wherein, if the award is to be provided, the award is divided among said players who selected the selection associated with the successful outcome.

9. The method of claim 7, wherein the designated number of players is selected from the group consisting of: all of said plurality of the players of the gaming machines, less than all of said plurality of the players of the gaming machines, a randomly determined number of players, and a predetermined number of players.

10. The method of claim 7, wherein the bonus game is associated with a plurality of trivia questions, each of said trivia questions associated with one of said plurality of sets of selections, wherein at least one of said selections of the set is associated with a correct answer to said trivia question and at least one of said selections of the set is associated with an incorrect answer to said trivia question, and which includes causing the at least one central controller to, if the determination is made to initiate the bonus game:

(i) select and cause a display of one of said plurality of trivia questions and the set of selections associated with said trivia question;

(ii) receive, from each of said plurality of the players of the gaming machines, a selection of one of the selections from the set of selections associated with the displayed trivia question;

(iii) determine whether any of said plurality of the players of the gaming machines selected the selection associated with the correct answer to the displayed trivia question;

(iv) if a number of players who selected the selection associated with the correct answer meets or exceeds a designated number of players, repeat (i) to (iii) at least once; and (v) if the number of players who selected the selection associated with the correct answer does not meet or exceed the designated number of players, cause an award to be provided to one or more of said players who selected the selection associated with the correct answer, if any.

11. The method of claim 10, wherein the selected trivia question and set of selections associated with said trivia question have a difficulty level selected according to a criterion, the criterion being independent of player preference.

12. The method of claim 10, wherein the criterion is selected from the group consisting of: a random selection, a past performance of one or more of the players, and a status in the bonus game.

13. The method of claim 7, which is provided through a data network.

14. The method of claim 13, wherein the data network is the internet.

15. A non-transitory computer readable medium including a plurality of instructions which, when executed by at least one central controller, cause the at least one central controller to communicate with each of a plurality of gaming machines to:

(a) determine whether to initiate a play of a bonus game for a plurality of the players of the gaming machines, said bonus game associated with a plurality of sets of selections, each set including a plurality of selections, wherein at least one of said selections of the set is associated with a successful outcome and at least one of said selections of the set is associated with an unsuccessful outcome; and (b) for said play of the bonus game:

(i) select and cause a display of one of said sets of selections;

(ii) receive, from each of said plurality of the players of the gaming machines, a selection of one of the selections of the displayed set;

(iii) determine whether any of said plurality of the players of the gaming machines selected the selection associated with the successful outcome;

(iv) if a number of players who selected the selection associated with the successful outcome meets or exceeds a designated number of players, repeat (i) to (iii) at least once; and (v) if the number of players who selected the selection associated with the successful outcome does not meet or exceed the designated number of players, cause an award to be provided to one or more of said players who selected the selection associated with the successful outcome, if any.

16. The non-transitory computer readable medium of claim 15, wherein, if the award is to be provided, the award is divided among said players who selected the selection associated with the successful outcome.

17. The non-transitory computer readable medium of claim 15, wherein the designated number of players is selected from the group consisting of: all of said plurality of the players of the gaming machines, less than all of said plurality of the players of the gaming machines, a randomly determined number of players, and a predetermined number of players.

18. The non-transitory computer readable medium of claim 15, wherein the bonus game is associated with a plurality of trivia questions, each of said trivia questions associated with one of said plurality of sets of selections, wherein at least one of said selections of the set is associated with a correct answer to said trivia question and at least one of said selections of the set is associated with an incorrect answer to said trivia question, and the plurality of instructions, when executed by the at least one central controller, cause the at least one central controller to, if the determination is made to initiate the bonus game:

(i) select and cause a display of one of said plurality of trivia questions and the set of selections associated with said trivia question;

(ii) from each of said plurality of the players of the gaming machines, receive a selection of one of the selections from the set of selections associated with the displayed trivia question;

(iii) determine whether any of said plurality of the players of the gaming machines selected the selection associated with the correct answer to the displayed trivia question;

(iv) if a number of players who selected the selection associated with the correct answer meets or exceeds a designated number of players, repeat (i) to (iii) at least once; and (v) if the number of players who selected the selection associated with the correct answer does not meet or exceed the designated number of players, cause an award to be provided to one or more of said players who selected the selection associated with the correct answer, if any.

19. The non-transitory computer readable medium of claim 18, wherein the selected trivia question and set of selections associated with said trivia question have a difficulty level selected according to a criterion, the criterion being independent of player preference.

20. The non-transitory computer readable medium of claim 18, wherein the criterion is selected from the group consisting of: a random selection, a past performance of one or more of the players, and a status in the bonus game.

* * * * *

UNITED STATES PATENT AND TRADEMARK OFFICE

CERTIFICATE OF CORRECTION

PATENT NO. : 8,585,489 B2
APPLICATION NO. : 13/242023
DATED : November 19, 2013
INVENTOR(S) : Lee E. Cannon It is certified that error appears in the above-identified patent and that said Letters Patent is hereby corrected as shown below:

IN THE CLAIMS

In Claim 4, Column 17, Line 2, between “the” and “bonus” insert --play of the--.
In Claim 4, Column 17, Line 16, replace “a” with --the--.
In Claim 4, Column 17, Line 21, replace “an” with --the--.
In Claim 5, Column 17, Line 25, replace “machine” with --system--.
In Claim 6, Column 17, Line 29, replace “4” with --5--.
In Claim 10, Column 18, Line 25, between “the” and “bonus” insert --play of the--.
In Claim 10, Column 18, Line 37, replace “a” with --the--.
In Claim 10, Column 18, Line 42, replace “an” with --the--.
In Claim 12, Column 18, Line 50, replace “10” with --11--.
In Claim 14, Column 18, Line 57, replace “the” with --an--.
In Claim 18, Column 20, Line 5, between the second instance of “the” and “bonus” insert --play of the--.
In Claim 18, Column 20, Line 19, replace “a” with --the--.
In Claim 18, Column 20, Line 24, replace “an” with --the--.
In Claim 20, Column 20, Line 34, replace “18” with --19--.

Signed and Sealed this
Seventeenth Day of March, 2015

Michelle K. Lee

Michelle K. Lee
*Director of the United States Patent and Trademark Office*